United States Patent [19]

Bowerman, Jr. et al.

[11] 4,284,742
[45] Aug. 18, 1981

[54] PUNCTURE-SEALING TIRE

[75] Inventors: Harold H. Bowerman, Jr., Fairview Park; Robert W. Ireland, Avon Lake, both of Ohio

[73] Assignee: The B. F. Goodrich Company, Akron, Ohio

[21] Appl. No.: 113,883

[22] Filed: Jan. 21, 1980

Related U.S. Application Data

[62] Division of Ser. No. 791,759, Apr. 28, 1977, Pat. No. 4,214,619.

[51] Int. Cl.³ ............................ C08F 8/32; B60C 5/14; B60C 17/00
[52] U.S. Cl. ............................ 525/329; 525/333; 525/335; 525/336; 525/375; 525/381; 525/352; 525/354; 525/289; 525/382; 526/312; 526/317; 526/320; 526/328; 526/338; 526/348.3; 152/347; 156/115; 428/912
[58] Field of Search ............................ 152/347, 330 R; 156/115; 106/33; 428/912; 525/375, 381, 382, 329, 332–336, 326, 352, 354, 289; 526/338, 317, 348.6, 348.3, 319, 328, 312, 320

[56] References Cited

U.S. PATENT DOCUMENTS

| 3,935,893 | 2/1976 | Stang et al. | 260/880 B |
| 4,058,657 | 11/1977 | Ireland | 526/324 |
| 4,129,713 | 12/1978 | Skillicorn | 525/381 |
| 4,147,854 | 4/1979 | Skillicorn | 525/381 |

Primary Examiner—John E. Kittle
Assistant Examiner—Lois E. Boland
Attorney, Agent, or Firm—Joe A. Powell

[57] ABSTRACT

A puncture-sealing tubeless pneumatic tire having an inner layer of soft, tacky, extensible sealant consisting of (1) at least one vinylidene-terminated liquid polymer and (2) at least one amine.

5 Claims, 2 Drawing Figures

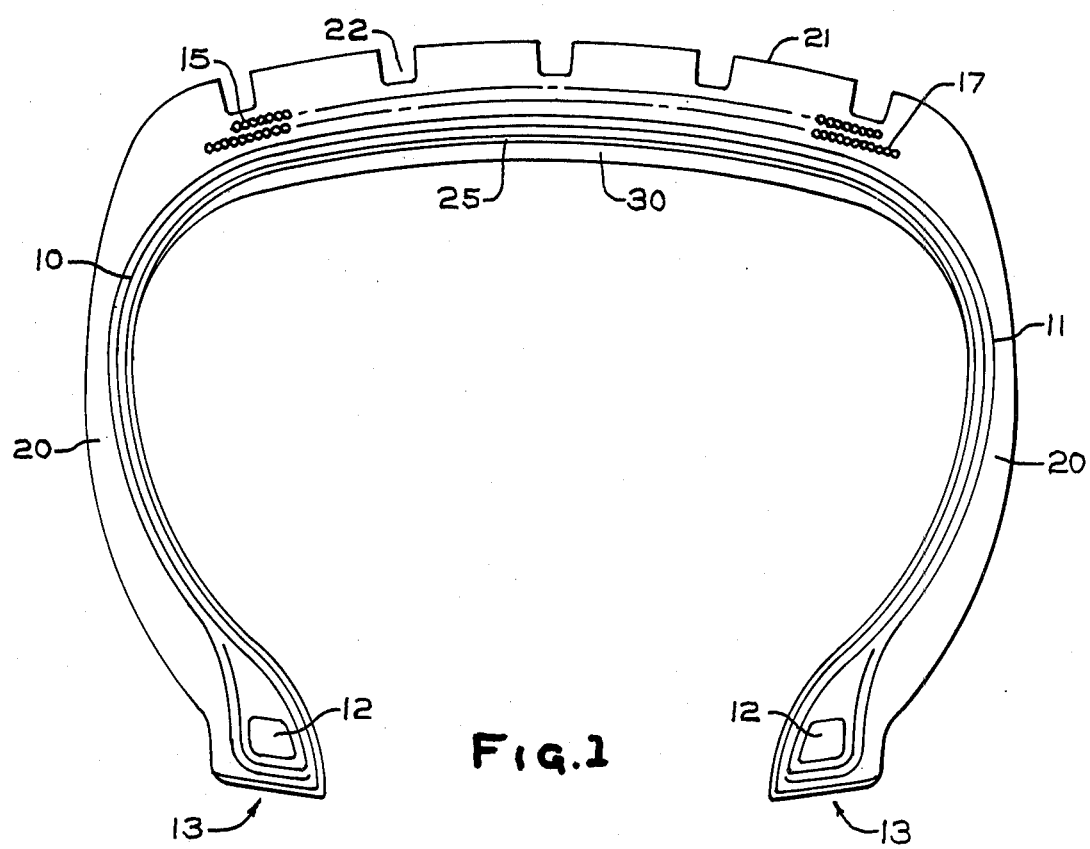
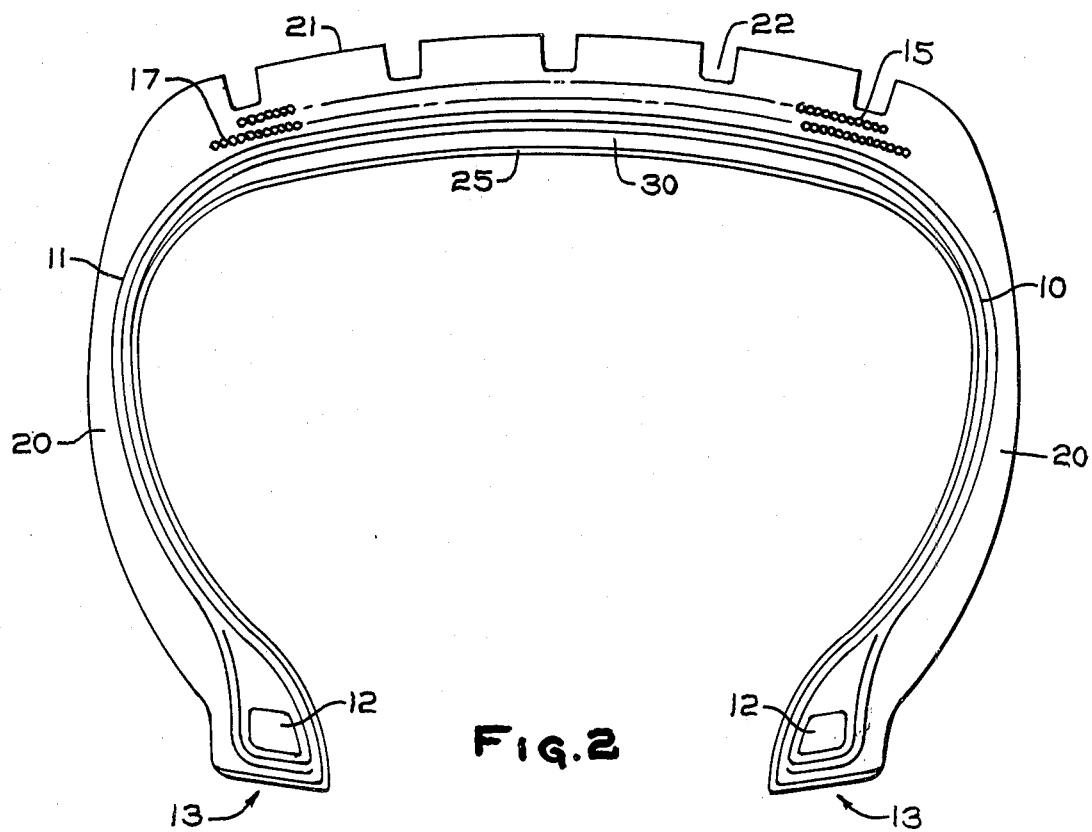

PUNCTURE-SEALING TIRE

This is a division of application Ser. No. 791,759, filed Apr. 28, 1977 now U.S. Pat. No. 4,214,619.

BACKGROUND OF THE INVENTION

A pneumatic tire has historically been sought which has a reliable means of retarding or stopping its deflation upon being punctured. Such a tire would reduce the frequency of tire changes on our high-speed interstate highways, thereby resulting in increased safety for the motoring public. Because attention to vehicle safety is on the increase, many vehicle and tire manufacturers have become interested in equipping vehicles with pneumatic tires having the capability of either sealing or reducing the rate of inflation loss after puncture. Some vehicle and tire manufacturers have become interested in equipping vehicles with such a tire in conjunction with a low-pressure warning device that would inform the motorist when the tire-inflation pressure drops below a prescribed amount and then the "slow-leak" feature of such a tire would allow the motorist to take corrective action.

Various approaches to achieve a sealant or "slow-leak" pneumatic tire have been proposed without lasting commercial success. One approach that has been proposed is to attach a layer of elastomer sealant containing no curatives to the inside of the unvulcanized tire. The tire is then vulcanized resulting in an unvulcanized sticky layer of elastomer on the inside of the vulcanized tire which acts as a sealant. This approach has not had significant commercial success because of manufacturing, technical, and economic problems associated with producing such a tire. The unvulcanized layer of elastomer sealant has a tendency to stick to the curing bladder thus causing high amounts of unacceptable tires.

The above problems are overcome by applying the sealant to a vulcanized tire. U.S. Pat. No. 3,935,893 discloses a sealant which can be applied to a vulcanized tire. In U.S. Pat. No. 3,935,893, the sealant is made up of a combination of high-molecular weight curable butyl rubber, a liquid polybutylene tackifier, a partially hydrogenated block copolymer of styrene and a conjugated diene, carbon black and suitable curing agents for the butyl rubber components.

New tire-sealant compounds which can be added to vulcanized tires or built into unvulcanized tires are desirable.

SUMMARY OF THE INVENTION

A puncture-sealing tubeless pneumatic tire having an inner layer of soft, tacky, extensible sealant consisting of (1) at least one vinylidene-terminated liquid polymer having the formula

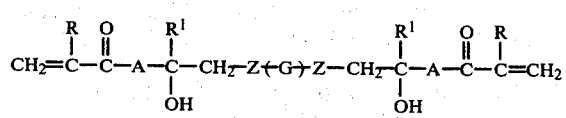

wherein Z is a bivalent radical selected from the group consisting of

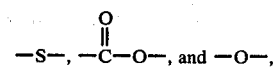

A is a bivalent radical containing 1 to 10 atoms of at least one atom selected from the group consisting of C, O, S, and N, R and $R^1$ are hydrogen or alkyl radicals containing 1 to 4 carbon atoms, and G is a carbon-carbon, polyether or polysulfide polymeric backbone. The vinylidene-terminated liquid polymer may contain an average of from about 1.5 to about 4 groups having the formula

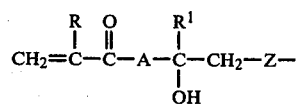

per molecule wherein Z, A, R, and $R^1$ are as defined heretofore; and (2) at least one difunctional or polyfunctional amine. The sealant layer has a thickness in the range of about 1 to about 50 percent of the total tire thickness, and may extend completely across the inside of the tire from one bead to the other bead but is preferably only under the tread area of the tire (where punctures are most likely to occur). The sealant layer is preferably attached to the air impervious liner such that the sealant is in contact with the inflation gas but can be positioned between the innermost carcass reinforcement ply and the air impervious liner.

BRIEF DESCRIPTION OF THE DRAWINGS

FIG. 1 is a cross-sectional view of a typical tubeless passenger-car tire having as its innermost portion in the crown area a sealant layer.

FIG. 2 is a cross-sectional view of a typical tubeless passenger-car tire having a sealant located between the innermost carcass ply and an air-impervious liner.

DETAILED DESCRIPTION

This invention can be used in any kind or size of tubeless pneumatic tire, but since a constantly increasing proportion of tires is being made with radial-cord carcass, the invention is illustrated in connection with a radial cord, tubeless, passenger-car tire.

Pneumatic tires generally consist of a flexible-cord carcass or body to resist the pressure of the inflation gas, terminated at each side edge by a bead which engages the rim of a wheel. The cords are embedded in rubber, and are protected from abrasion by tread and sidewall rubber, and are made to hold air by preferably having an integral essentially impervious liner on the interior of the carcass.

In the drawing, FIG. 1, two plies of carcass cords 10 and 11, which may be high tenacity rayon, polyester, or other suitable material, lie with the individual rubberized cords essentially in radial planes. The edges of the plies are suitably wrapped around inextensible bead grommets 12 forming part of molded beads 13 shaped for engagement with a standard rim.

The radial-cord plies 10 and 11 in the crown of the tire, which is the region capable of engaging the road, are surrounded by a circumferential belt, which in this instance is shown as consisting of two strips of steel cords, but could be of other low-extensible material such as aromatic polyamide fibers also known as aramid fibers. The steel-cord belt plies 15 and 17 are preferably prepared with the cords in each ply parallel to each other and at an angle to the circumferential central plane of the tire, the cords in one ply extending in a direction opposite to the cords in the other ply. The angle in the finished tire may be about 15° to 30° relative to the central circumferential plane. The two crown plies form an essentially inextensible belt around the radial-cord plies.

A protective layer of rubber completely surrounds the tire. This is preferably composed of a moderate thickness of sidewall rubber 20 in the zones where intense flexing occurs, and a thick layer of tread rubber 21 for resisting road wear. The tread layer has a suitable nonskid pattern 22 of slits, slots, grooves and the like.

On the inner face of the tire is a liner 25 composed of a rubber material having resistance to diffusion of air such as butyl rubber or halogenated butyl rubber, and/or blends thereof, and extending from one bead 13 to the other bead so as to seal against the rim and minimize loss of inflation gas or its penetration into the body of the tire.

In accordance with this invention, the improved tire has, in addition to the features just described which were known before this invention, a sealant layer 30 of a vinylidene-terminated liquid polymer which is placed inside the tire. The sealant layer 30 can extend from one bead 13 to the other bead but preferably extends only across the entire crown portion of the tire, that is, under the entire tread where punctures are most likely to occur.

Vinylidene-Terminated Polymers - Introduction

Vinylidene-terminated polymers suitable for use in this invention are liquids having Brookfield viscosities (measured using a Brookfield LTV viscometer at 27° C.) from about 500 cps to about 2,500,000 cps, preferably from about 500 cps to about 1,200,000 cps.

Vinylidene-terminated polymers suitable for use in this invention can be made by several methods. (A) For example, vinylidene-terminated liquid polymers can be prepared by reaction of (1) a liquid polymer having at least terminal functional groups selected from the group consisting of carboxyl, hydroxyl and mercaptan, and (2) a compound containing both an oxirane group

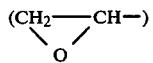

and a vinylidene group. The reaction between (1) and (2) may be catalyzed. (B) Another method of preparing vinylidene-terminated polymers comprises reacting a liquid polymer having at least terminal epoxy groups with acrylic acid or methacrylic acid. For example, a diglycidyl ether of a bisphenol compound can be reacted with acrylic acid or methacrylic acid to form a diacrylate ester; the reaction product contains two terminal vinyl groups per molecule. This reaction can be catalyzed. Thus, it is seen that the method of preparing the vinylidene-terminated polymer is not critical. The essential features of the polymer are that it has at least terminal vinylidene groups and a polymeric backbone comprising carbon-carbon, polyether or polysulfide linkages.

Vinylidene-Terminated Liquid Polymer Preparation-Method A

The following discussion describes in detail the preparation of vinylidene-terminated liquid polymers by reaction of (1) a liquid polymer having at least terminal functional groups selected from the group consisting of carboxyl, hydroxyl and mercaptan, and (2) a compound containing both an oxirane group

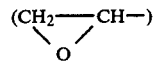

and a vinylidene group. Vinylidene-terminated liquid polymers prepared by the latter method may have the formula

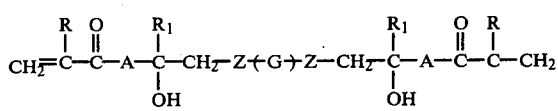

where Z is a bivalent radical selected from the group consisting of

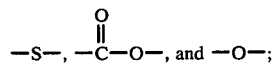

A is a bivalent radical containing 1 to 10 atoms of at least one atom selected from the group consisting of C, O, S and N; and R and $R^1$ are hydrogen or alkyl radicals containing 1 to 4 carbon atoms. Z radicals are listed above in decreasing order of preference. The radical Z is the remaining fragments of the carboxyl group of the carboxyl-terminated polymer yielding

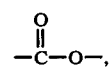

the hydroxyl group of the hydroxyl-terminated polymer yielding —O—, or the mercaptan group of the mercaptan-terminated polymer yielding —S—. The radical A originates from the compound containing both an oxirane group and a vinylidene group and is described more fully hereinafter.

Carboxyl-terminated liquid polymers suitable for use in preparing vinylidene-terminated liquid polymers can be prepared by free-radical polymerization using carboxyl-containing initiators and/or modifiers as disclosed in U.S. Pat. No. 3,285,949 and German Pat. No. 1,150,205 and by solution polymerization using lithium metal or organometallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, carboxyl-terminated polymers can be prepared from hydroxyl-terminated liquid polymers by reaction with dicarboxyl compounds or anhydrides. Thus, it is seen that the method of preparing the carboxyl-terminated liquid polymer is not critical. The essential features of the polymer are that it have at least terminal carboxyl groups and a polymeric backbone comprising carbon-carbon linkages.

Carboxyl-terminated polymers prepared by these methods have a theoretical functionality of about 2.0, i.e., one carboxyl group at each end of a polymer molecule. However, the actual average functionality may be from about 1.1 to about 2, more preferably from about 1.7 to about 2.0 of carboxyl groups per molecule. However, the functionality may exceed 2.0 if some of said groups are present as pendant to polymer molecules and are formed by reaction of acrylic acid or the like polymerized in the backbone G of the polymer. When the polymeric backbone G contains polymerized therein appreciable amounts of acrylic acid or the like, the carboxyl-terminated polymer contains an average of about 1.5 to about 4 carboxyl groups per molecule.

The polymeric backbone G in the above formula is the polymeric backbone of the functionally-terminated liquid polymer reactant (1) and can have carbon-carbon, polyether or polysulfide linkages. A preferred backbone has carbon-carbon linkages. The carbon-carbon linkages contain polymerized units of at least one vinylidene monomer having at least one terminal $CH_2=C<$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene, and the like; (b) dienes containing 4 to 10 carbon atoms, more preferably 4 to 8 carbon atoms, such as butadiene, isoprene, 2-isopropyl-1, 3-butadiene, chloroprene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

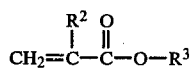

wherein $R^2$ is hydrogen, an alkyl or hydroxy alkyl radical containing 1 to 3 carbon atoms and $R^3$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^3$ is hydrogen or an alkyl or hydroxyl alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate, and the like. Often two or more types of theses polymerized monomeric units are contained in the polymeric backbone.

More preferred liquid polymers contain polymerized units of at least one vinylidene monomer having at least one terminal $CH_2=C<$ group. The monomers are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

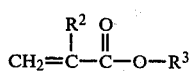

wherein $R^2$ is hydrogen or an alkyl radical containing 1 to 3 carbon atoms and $R^3$ is hydrogen, an alkyl or hydroxy alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^3$ is hydrogen or an alkyl or hydroxyl alkyl radical containing 1 to 8 carbon atoms. Excellent results were obtained with dienes containing 4 to 10 carbon atoms, more preferably 4 to 8 carbon atoms.

The vinylidene monomers described above are readily polymerized with from 0% up to about 50% by weight, more preferably from 0% to about 30% by weight of at least one comonomer selected from the group consisting of (f) vinyl aromatics having the formula

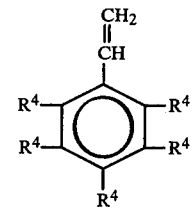

wherein $R^4$ is hydrogen, halogen, an alkyl or hydroxy alkyl radical containing from 1 to 4 carbon atoms, such as styrene, α-methyl styrene, chlorostyrene, vinyl toluene, and the like; (g) vinyl nitriles having the formula

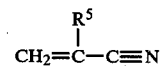

wherein $R^5$ is hydrogen or an alkyl radical containing 1 to 3 carbon atoms, such as acrylonitril, methacrylonitrile, and the like; (h) vinyl halides such as vinyl bromide, vinyl chloride, and the like; (i) divinyls and diacrylates such as divinyl benzene, divinyl ether, diethylene glycol diacrylate, and the like; (j) amides of α,β-olefinically unsaturated carboxylic acids containing 2 to 8 carbon atoms such as acrylamide, and the like; and (k) allyl alcohol, and the like. Liquid polymer compositions comprising polymerized units of a major amount of at least one vinylidene monomer listed in (a) to (e) with a minor amount of at least one comonomer listed in (f) to (k) are within the scope of the invention.

More preferred comonomers may be selected from the group consisting of (f) vinyl aromatics having the formula

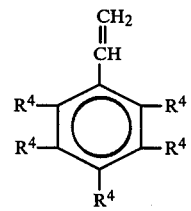

wherein $R^4$ is selected from the group consisting of hydrogen, halogen, alkyl or hydroxy alkyl radicals containing 1 to 4 carbon atoms; and (g) vinyl nitriles having the formula

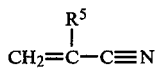

wherein $R^5$ is hydrogen or an alkyl radical containing 1 to 3 carbon atoms.

Examples of useful liquid polymeric backbones comprising carbon-carbon linkages include polyethylene, polyisobutylene, polyisoprene, polybutadiene, poly(vinyl ethyl ether), poly(ethyl acrylate), and poly(butyl acrylate) as well as copolymers of butadiene and acrylonitrile; butadiene and styrene; vinyl acetate and isoprene; vinyl acetate and chloroprene; vinyl ethyl ether and diallyl ether; vinyl ethyl ether and α-methyl styrene; vinyl ethyl ether and vinyl bromide; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and vinyl bromide; ethyl acrylate and acrylic acid; ethyl acrylate and acrylamide; ethyl acrylate and allyl alcohol; butyl acrylate, styrene and isoprene; butyl acrylate and styrene; butyl acrylate and acrylonitrile; butyl acrylate and vinyl chloride; and the like; as well as terpolymers of butadiene-acrylonitrile with acrylic acid, ethyl acrylate, n-butyl acrylate and the like.

Examples of preferred carboxyl-terminated liquid polymers include carboxyl-terminated polyethylene, carboxyl-terminated polyisobutylene, carboxyl-terminated polybutadien, carboxyl-terminated polyisoprene, carboxyl-terminated poly(ethyl acrylate), carboxyl-terminated copolymers of butadiene and acrylonitrile and of butadiene and styrene as well as carboxyl-terminated terpolymers of butadiene, acrylonitrile, and acrylic acid and the like. Carboxyl-terminated terpolymers of butadiene acrylonitrile, and acrylic acid were found to be especially useful. These polymers may contain from about 50% to about 95% by weight of butadiene, from about 5% to about 40% by weight of acrylonitrile from about 0.5% to about 10% by weight of a third monomer such as acrylic acid where used, and from about 0.5% to about 10% by weight of carboxyl, based upon total polymer weight.

Hydroxyl-terminated liquid polymers suitable for use in preparing vinylidene-terminated liquid polymers can be prepared by post-reacting carboxyl-terminated polymers as disclosed in U.S. Pat. Nos. 3,551,471 and 3,551,472; by free-radical polymerization of monomers using hydroxyl-containing initiators as disclosed in U.S. Pat. No. 2,844,632; and by solution polymerization using lithium or organo-metallic catalyst and post-reacting the product to form the hydroxyl groups as disclosed in U.S. Pat. Nos. 3,135,716 and 3,431,235. Thus, it is seen that the method of preparing the hydroxyl-terminated liquid polymer is not critical. The essential features of the polymer are that it have at least terminal hydroxyl groups and a polymeric backbone comprising carbon-carbon linkages. Examples of preferred hydroxyl-terminated liquid polymers include hydroxyl-terminated polyethylene, hydroxyl-terminated polyisobutylene, hydroxyl-terminated polybutadiene, hydroxyl-terminated polyisoprene, hydroxyl-terminated (ethyl acrylate), hydroxyl-terminated copolymers of butadiene and acrylonitrile and of butadiene and styrene, as well as hydroxyl-terminated terpolymers of butadiene, acrylonitrile, and 2-hydroxyethyl acrylate, and the like.

Mercaptan-terminated liquid polymers suitable for use in preparing vinylidene-terminated liquid polymers can be prepared by free-radical polymerization of monomers in the presence of dixanthogen disulfide followed by post-reaction to form mercaptan groups as disclosed in U.S. Pat. Nos. 3,449,301 and 3,580,830. Examples of prepared mercaptan-terminated liquid polymers include mercaptan-terminated polyethylene, mercaptan-terminated polyisobutylene, mercaptan-terminated polybutadiene, mercaptan-terminated polyisoprene, mercaptan-terminated poly(ethyl acrylate), as well as mercaptan-terminated copolymers of butadiene and acrylonitrile and of butadiene styrene.

Vinylidene-terminated liquid polymers prepared by using the above liquid polymers will have the same theoretical functionality as the precursor reactive liquid polymer; that is one group having the formula

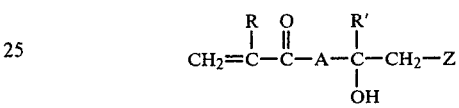

at each end of a polymer molecule. However, the actual average functionality may be from about 1.5 to about 4, more preferably from about 1.7 to about 2.0 of such

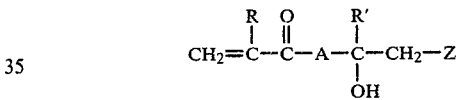

groups per molecule. Thus, some of said groups may also be pendant to polymer molecules and are formed by reaction of the oxirane-vinylidene compound with acrylic acid or the like polymerized in the backbone G of the polymer.

The liquid polymer reactants can contain more than one type of functional group. For example, the polymers can have terminal carboxyl groups and internal pendant epoxy groups derived from interpolymerized units of glycidyl acrylate monomer; or, the polymers can contain terminal mercaptan groups and internal pendant carboxyl groups derived from interpolymerized units of acrylic acid.

Suitable oxirane-vinylidene compounds of use in preparing the vinylidene-terminated polymers of this invention have the formula

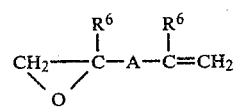

wherein $R^6$ is hydrogen or an alkyl radical containing from 1 to 4 carbon atoms, more preferably hydrogen or methyl, and A is a bivalent radical containing from 1 to 10 atoms of at least one atom selected from the group consisting of C, O, S and N. Examples of such compounds include isopropenyl glycidyl ether, allyl glycidyl ether, methallyl glycidyl ether, glycidyl acrylate, glycidyl methacrylate, 1,5-hexadiene monoepoxide, and the like. More preferably the compound contains an acrylyl or alkaacrylyl radical and has the formula

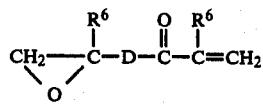

wherein $R^6$ is hydrogen or an alkyl radical containing 1 to 4 carbon atoms, more preferably hydrogen. D is a bivalent radical containing from 1 to 9 atoms of at least one atom selected from the group consisting of C, O, S and N, more preferably 1 to 4 atoms of carbon and/or O, S, and N. Examples of more preferred compounds include glycidyl acrylate and glycidyl methacrylate. D is —CH$_2$—O— when the oxirane-vinylidene compound is glycidyl acrylate or glycidyl methacrylate.

Carboxyl-terminated polymers described heretofore were found to be excellent polymer reactants for the reaction with the compound containing both an oxirane group and a vinylidene group. The carboxyl-terminated liquid polymers may have carboxyl equivalent weight (gram molecular weight per carboxyl group) from about 200 to about 10,000, more preferably from about 400 to about 5,000. Thus, some carboxyl groups may also be pendant to polymer molecules. The average number of total carboxyl groups (functionality) typically may be from about 1.5 to about 4 groups per molecule, more preferably from about 1.7 to about 2.5 groups per molecule. The average carboxyl functionality may be determined by the following equation:

$$F = \frac{M_n^- \times E_{phr}}{100}$$

where F=functionality,
$M_n^-$ =molecular weight,
$E_{phr}$ =number of equivalences per 100 parts of carboxyl-terminated liquid polymer.

Molecular weight ($M_n^-$) can be measured using a Vapor Pressure Osmometer or by gel permeation chromotography. The number of equivalents per 100 parts of carboxyl-terminated liquid polymer ($E_{phr}$) is determined by titration of a polymer solution to a phenolphthalein end-point using alcoholic KOH. The carboxyl-terminated liquid polymers used may have Brookfield viscosities (measured using a Brookfield LVT at 27° C.) from about 500 cps to about 2,500,000 cps, more preferably from about 500 cps to about 1,200,000 cps.

The carboxyl-terminated liquid polymers can be reacted with a compound containing both an oxirane group and a vinylidene group at a ratio from about 1 to about 3 equivalents and more of epoxy per equivalent of carboxyl. However, use of more than 3 equivalents of epoxy per equivalent of carboxyl is unnecessary to achieve excellent results.

The reaction can be conducted in bulk, preferably employing an excess of the oxirane-vinylidene compound. A solvent may be used in this reaction. Solvent choice is influenced by solubility of the specific functionally-terminated liquid polymer used. Examples of useful solvents include aliphatic ketones and ethers such as acetone, methylethyl ketone, terahydrofuran and the like. More preferred are chlorinated hydrocarbons such as chloroform and aromatic solvents such as benzene, toluene, xylene, and the like. Toluene was found to be an excellent solvent for a variety of the functionally-terminated liquid polymers described heretofore.

Reaction temperature can be from about 0° C. to about 200° C., more preferably from about 50° C. to about 150° C. Total reaction time varies directly with temperature and catalyst amount but is generally from about 2 hours to about 24 hours. Preferably the reaction is conducted in the presence of air or oxygen.

The carboxyl-oxirane reaction rate can be accelerated by use of a catalyst in an amount from about 0.05 to about 2 weight parts, more preferably from about 0.1 to about 1 weight part, of catalyst per 100 weight parts of functionally-terminated liquid polymer reactant. Suitable catalysts include trimethylamine, triphenylphosphine, p-toluenesulfonic acid, and the like.

Vinylidene-Terminated Polymer Preparation-Method B

The following discussion describes the preparation of vinylidene-terminated polymers by reaction of (1) a diglycidyl ether or polyglycidyl ether of a bisphenolic compound having the formula

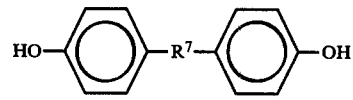

wherein $R^7$ is a bivalent radical containing 1 to 40 atoms of at least one atom selected from the group consisting of C, O, S, and N, more preferably an alkylene or alkylidene group containing 1 to 8 carbon atoms, and even more preferably an alkylene or alkylidene group containing 1 to 6 carbon atoms, and (2) acrylic acid or methacrylic acid. To make these vinylidene-terminated polymers other diepoxides can be used, such as those listed in Handbook of Epoxy Resins, Lee and Neville, 1967, Chapter 4. Thus the diglycidyl ether is not critical, others may be used. Examples of suitable bisphenols include methylene bisphenol, isopropylidene bisphenol, butylidene bisphenol, octylidene bisphenol, bisphenol sulfide, bisphenol sulfone, bisphenol ether, and the like. Excellent results were obtained using isopropylidene bisphenol (bisphenol A).

Vinylidene-terminated polymers prepared by the latter method are preferred examples of polymers of the formula given heretofore:

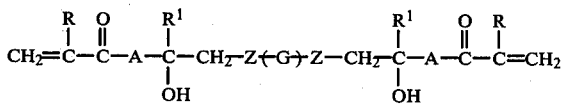

wherein Z is —O—, A is —O—, R is hydrogen or methyl, $R^1$ is hydrogen, and the polymeric backbone G is the polyether residue of the diglycidyl ether of a bisphenol and has the formula

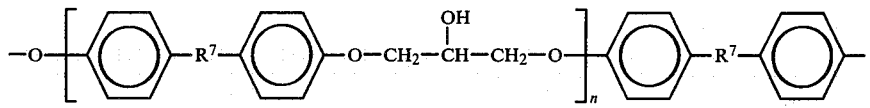

wherein R[7] is as defined heretofore and n is from 0 to 20, more preferably from about 0 to 2. In other words, vinylidene-terminated polymers prepared by the method just described may have the formula

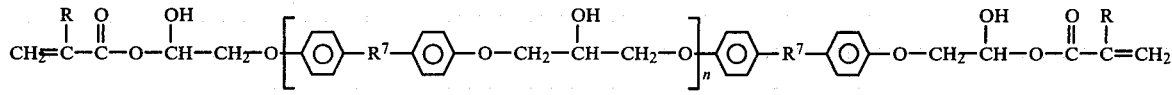

wherein R is hydrogen or methyl and R[7] and n are as defined heretofore.

The vinylidene-terminated polymers used in this invention have highly reactive terminal vinylidene groups. Therefore, preferably they are mixed with an inhibitor and/or antioxidant to hinder premature polymerization and/or oxidation. The antioxidant is used in a range from about 0.1 to about 5 parts, more preferably from about 0.5 to 2 parts by weight per 100 parts by weight of polymer. The inhibitor is used in a range from about 10 to about 1000 parts, more preferably from about 50 to about 500 parts by weight per one million parts by weight of polymer. Suitable antioxidants include phenyl-$\beta$-naphthylamine, di-$\beta$-naphthyl-p-phenylenediamine, 2,6-di-t-butyl paracresol, 2,4,6-trihexyl phenol, 1,3,5-tris-(3,5-di-t-butyl-4-hydroxybenzyl)isocyanurate, and the like. Suitable inhibitors include hydroquinone and the methyl ether of hydroquinone.

In addition to the vinylidene-terminated liquid polymer, the sealant must contain at least one difunctional or polyfunctional amine to cure the liquid polymer. Difunctional and polyfunctional amines suitable for use in this invention include aliphatic diamines containing from 2 to 40 carbon atoms, more preferably from 2 to 20 carbon atoms, and at least two primary or secondary, more preferably two, secondary amine groups. Also, suitable area alicyclic diamines containing from 4 to 40 carbon atoms, more preferably from 4 to 20 carbon atoms, and at least two primary or secondary, more preferably two, secondary amine groups. Heterocyclic diamines may also be used which contain from 2 to 40 carbon, more preferably from 2 to 16 carbon atoms, and at least two primary or secondary, more preferably two, secondary amine groups. Examples of suitable diamines just described include aliphatic amines such as ethylenediamine, 1,2-propanediamine, 1,3-propanediamine, 1,4-butadienediamine, 2-methyl-1,2-propanediamine,1,5-pentanediamine, 1,6-hexanediamine, 1,7-heptanediamine, 1,8-octanediamine, 1,10-decanediamine, 1,12-dodecanediamine, polyoxypropyleneamines sold under the name of Jeffamine, and the like; aliphatic polyamines such as diethylenetriamine, triethylenetetraamine, tetraethylenepentamine, bis-(hexamethylene) triamine, 3,3'-iminobispropylamine, and the like; alicyclic diamines and polyamines such as 1,2-diaminocyclohexane, 1,8-p-menthanediamine, and the like; and heterocyclic diamines and polyamines such as 4-(amino-methyl)-piperidine; piperazine; 1,3-di-4-piperidylpropane; N-(aminoalkyl)piperazines wherein each alkyl group contains from 2 to 12 carbon atoms, more preferably 2 to 6 carbon atoms, such as N-(2-aminoethyl)piperazine, N-(3-amino-propyl)piperazine, N,N'-bis (3-aminopropyl piperazine, and the like. Suitable results were obtained using N-(2-aminoethyl)piperazine; 1,3-di-4-piperidylpropane; and a polyoxypropyleneamine sold under the name of Jeffamine T-403. Excellent results were obtained used 1,3-di-4-piperidylpropane.

Aromatic diamines are also suitable for use in this invention. Suitable aromatic amines contain at least two primary or secondary amine groups bonded directly to at least one aromatic nucleus. Examples of suitable aromatic amines include 4,5-acenaphthenediamine, 3,5-diaminoacridine, 1,4-diaminoanthraquinone, 3,5-diaminobenzoic acid, 2,7-fluorenediamine, 1,5-naphthalenediamine, 1,8-naphthalenediamine, 2,4-toluenediamine, 2,6-toluenediamine, o-phenylenediamine, m-phenylenediamine, p-phenylenediamine, and the like.

When the vinylidene-terminated polymers are produced according to Method B, described heretofore, it is preferred to use a polymeric diamine as a curing agent. Polymeric diamines suitable for use as a curing agent include amine-terminated liquid polymers.

Amine-terminated liquid polymers suitable for use as a curing agent for vinylidene-terminated liquid polymers have the formula

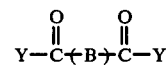

wherein Y is a univalent radical obtained by removing a hydrogen from an amine group of an aliphatic, alicyclic or heterocyclic amine containing at least two primary and/or secondary amine groups, and B is a polymeric backgone comprising carbon-carbon linkages. Generally, the carbon-carbon linkages comprise at least about 95% by weight of total polymeric backbone weight, more preferably about 100% by weight of total polymeric backbone weight. The amine-terminated polymers contain an average of from about 1.5 to about 4 primary and/or secondary amine groups per molecule, more preferably from about 1.7 to about 3 primary and/or secondary amine groups per molecule. The amine-terminated polymers may have Brookfield viscosities (measured using a Brookfield LVT viscometer at 27° C.) from about 500 cps to about 2,500,000 cps, more preferably from about 500 cps to about 1,200,000 cps. The amine-terminated liquid polymers may have amine equivalent weights (gram molecular weight per primary and/or secondary amine group, but exclusive of tertiary amine groups) from about 300 to about 4,000, more preferably from about 600 to about 3,000.

The amine-terminated liquid polymers can be prepared easily by reacting a carboxyl-terminated, ester-terminated or acid chloride-terminated liquid polymer having a carbon-carbon backbone with at least one aliphatic, alicyclic or heterocyclic amine containing at least two primary and/or secondary amine groups.

The level of amine used is best described by using equivalents. The number of amine equivalents used is from about 0.5 to about 3 equivalents per one equivalent of vinylidene-terminated liquid polymer. Preferably, the level of amine is from about 0.8 to about 2 equivalents per one equivalent of vinylidene-terminated liquid polymer.

The working life (time before composition thickens) of the sealant composition can be increased by first mixing a solvent or plasticizer with the amine before mixing the amine with the liquid rubber. The greater the amount of plasticizer or solvent used the longer the working life of the composition. Acetone and dioctyl phthalate were found to be particularly desirable in extending the working life of the composition.

In addition to the two essential ingredients (a vinylidene-terminated liquid polymer and an amine) the sealant may contain a broad range of other compounding ingredients. These ingredients are typical ingredients used in rubber compounding. Standard levels of these ingredients are used, such levels being well known in the art. A preferred limitation placed on the levels of compounding ingredients is that compositions containing them should be flowable without substantial sagging at temperatures ranging from about 20° C. to about 100° C. This generally limits the amount of reinforcing fillers and other ingredients which thicken the liquid composition to low levels of up to about 50 parts by weight at room temperature per 100 parts by weight of liquid polymer. If a plasticizer such as dioctyl phthalate or the like is used, even higher amounts of compounding ingredients can be used. The composition components can be mixed using mixing kettles, Henschel mixers, ink mills, Banbury mixers, or the like. Standard mixing techniques can be used, and no particular addition order is required.

Examples of compounding ingredients include reinforcing fillers such as carbon blacks, metal carbonates and silicates, and glass, asbestos, and textile fibers; colorants such as metal oxides and metal sulfides, and organic colorants; lubricants and plasticizers such as petroleum oils, castor oil, glycerin, silicones, aromatic and paraffinic oils, and alkyl and aromatic phthalates, sebacates, trimellitates, and the like; and antioxidants and stabilizers such as phenyl-β-naphthlamine,2,6-di-t-butyl paracresol, 2,2'-methylenebis(4-ethyl-6-t-butyl phenol), 2,2'-thiobis(4-methyl-6-t-butylphenol), 4,4,'-butylidene-bis-(6-t-butyl-m-cresol), tris-(3,5-di-t-butyl-4-hydroxybenzyl)isocyanurate, hexahydro-1,3,5-tris-β-(3,5-di-t-butyl-4-hydroxyphenyl)-propionyl triazine, tetrakismethylene-3(3',5'-di-t-butyl-4'-hydroxyphenyl) propionate methane, distearyl thiodipropionate, tri(nonylated phenyl) phosphite, and the like.

The thickness of the sealant layer 30 is from about 1 to about 50 percent of the total tire thickness, as measured in the center of the tread area. Preferably, the thickness is from about 10 to about 30 percent of the total tire thickness. A typical thickness for a radial passenger tire is from about 0.1 inch to about 0.3 inch.

Tires can be produced according to this invention by first starting with a standard pneumatic tire. The inside of the tire (liner) must first be cleaned to remove the mold release agents. The liner can be cleaned by washing with a soap or a solvent solution, or by buffing or a combination of the two. U.S. Pat. No. 3,935,893 discloses a suitable method of cleaning the inside of a tire. The sealant is then applied to the inside of the tire, preferably by spraying. The sealant is then allowed to cure usually from about 10 minutes to about 2 hours depending on the cure system used.

An alternate method of practicing this invention is shown in FIG. 2. In this method, the air impervious liner (25) is coated with the liquid polymer sealant (30) and the two layers are built into the unvulcanized tire simultaneously. The tire is then vulcanized resulting in the sealant layer being located between the carcass ply 10 and the liner 25.

If the alternate method is used, the tires can be manufactured with ordinary equipment without alteration, and with only a slight increase in raw materials and labor costs. The principal change from ordinary practice is to first coat the liner 25 with the sealant layer. This can be done by spraying the liquid polymer sealant onto the liner or calendering the two layers together. The two-layer combination of liner and sealant is then applied to a building drum such that the liner layer is next to the drum. The remainder of the tire is built onto the drum as in a conventional radial tire. Once the tire is built, it is vulcanized in a press using standard tire-curing precedures and conditions which are well known in the art.

All components of the sealant can be mixed together and then sprayed or hand applied to the inside of the tire or if longer working life is desired, the amine should not be mixed with the polymer until just prior to spraying.

In order to further illustrate the present invention, the following examples are presented.

EXAMPLES

The vinylidene-terminated polymer, identified as VTBNX, used in the following examples was made by reacting glycidyl acrylate with a carboxyl-terminated liquid polybutadiene/acrylonitrile/acrylic acid terpolymer according to Method A described heretofore. The VTBNX has a butadiene content of about 68.3% by weight of polymer, an acrylonitrile content of about 16.2% and an acrylic acid content of about 1.2% by weight of polymer, and a vinylidene end-group content of about 14.3% by weight of polymer and functionality of about 2.3, and a Brookfield viscosity at 27° C. of about 320,000 cps and an equivalent weight of about 1,500, and a molecular weight $M_n^-$ of about 3,556. The carboxyl-terminated liquid polymer used to produce the VTBNX was prepared according to U.S. Pat. No. 3,285,949.

EXAMPLE 1

A standard BFGoodrich steel-belted radial passenger tire, size HR78-15, was obtained. The inside of the tire was thoroughly cleaned by washing with toluene solvent. The inside of the tire was coated using a trowel with a VTBNX liquid polymer containing 6 parts of 1,3-di-4-piperidylpropane(amine) and 6 parts of dioctyl phthalate (plasticizer) per 100 parts of polymer. 1.2 equivalent of amine was used per one equivalent of VTBNX. The amine and plasticizer were first mixed together to form a paste and then this paste was mixed into the polymer using a mixing kettle. The inside of the tire under the tread area was coated with the sealant composition. A layer of sealant 30 having a thickness of about 0.15 inch was applied to the tire. The sealant was allowed to cure at room temperature for about 12 hours before testing. The tire was mounted on a standard rim and inflated to 28 psig. The tire was then placed on the left rear position of an automobile and punctured with a 20 penny (0.191 inch diameter) nail. Testing was conducted by driving 55 mph. After 39.7 miles, the nail was thrown from the tire. After 355.8 miles, the test was terminated and the tire-inflation pressure checked. The tire had 26 psig inflation pressure.

EXAMPLE 2

A tire was prepared as in Example 1 using 6 parts of 1,3-di-4-piperidylpropane(amine) per 100 parts of VTBNX as the sealant 30 layer. The tire was mounted on a standard rim and inflated to 28 psig. The tire was then placed on the right rear position of an automobile and punctured with a 20 penny (0.191 inch diameter) nail which remained in the tire. Testing was conducted by driving 55 mph. The test was terminated after 7,000 miles and the tire-inflation pressure checked. The tire had 26 psig inflation pressure. This example shows that even after extensive testing (7,000 miles) the novel tire sealant of this invention was effective.

EXAMPLE 3

A tire was prepared as in Examples 1 and 2 except the amine used was N-(2-aminoethyl)piperazine. 8 parts of amine was mixed with 8 parts of dioctyl phthalate to form a solution. This solution was then mixed with 100 parts of VTBNX to form the sealant composition. 1.9 equivalents of amine was used per one equivalent of VTBNX. The sealant was applied to the tire and allowed to cure as in Example 1. The tire was mounted and inflated as in Example 1. The tire was punctured with a 20 penny nail and tested at 60 mph. After 85 miles, there was no pressure loss.

The above examples demonstrate that the novel sealants of this invention are effective in sealing tire punctures.

Pneumatic tires employing this invention are useful as tires on passenger cars, buses, trucks, farm and off-the-road equipment, aircraft, and the like.

We claim:

1. A tire sealant composition comprising: (1) at least one vinylidene-terminated polymer having the formula

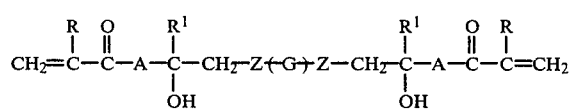

wherein Z is selected from the group consisting of

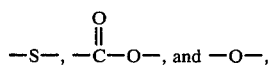

A is a bivalent radical containing 1 to 10 atoms wherein at least one of said atom is selected from the group consisting of C, O, S and N, R and $R^1$ are hydrogen or alkyl radicals containing 1 to 4 carbon atoms, and G is a polymeric backbone comprising carbon-carbon linkages, said vinylidene-terminated polymer containing an average of from about 1.5 to about 4

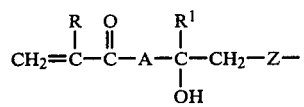

groups per molecule, wherein said backbone comprising carbon-carbon linkages contains polymerized units of at least one vinylidene monomer having at least one terminal $CH_2\!=\!C\!<$ group said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, (e) acrylic acids and acrylates having the formula

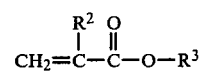

said $R^2$ being hydrogen or an alkyl radical containing 1 to 3 carbon atoms and said $R^3$ being hydrogen, an alkyl or hydroxy alkyl radical containing 1 to 18 carbon atoms, or an alkoxyalkyl, alkylthioalkyl or cyanoalkyl radical containing 2 to 12 carbon atoms; and (2) at least one amine selected from the group consisting of N-(2-aminoethyl) piperazine and 1,3-di-4-piperidylpropane.

2. A composition of claim 1 wherein said vinylidene monomer is selected from the group consisting of (a) monoolefins containing 2 to 8 carbon atoms, (b) dienes containing 4 to 8 carbon atoms, and (c) acrylic acids and acrylates having the formula

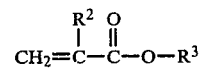

said $R^2$ being hydrogen or an alkyl radical containing 1 to 3 carbon atoms and said $R^3$ being hydrogen, an alkyl or hydroxyalkyl radical containing 1 to 8 carbon atoms, or an alkoxyalkyl, alkylthioalkyl or cyanoalkyl radical containing 2 to 8 carbon atoms.

3. A composition of claim 2 wherein said vinylidene monomer contains copolymerized therewith up to about 50 percent by weight of at least one comonomer selected from the group consisting of (a) vinyl aromatics having the formula

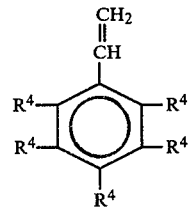

wherein $R^4$ is hydrogen, halogen, an alkyl or hydroxy alkyl radical containing from 1 to 4 carbon atoms, (b) vinyl nitriles having the formula

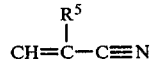

wherein $R^5$ is hydrogen of an alkyl radical containing 1 to 3 carbon atoms, (c) vinyl halides, (d) divinyls and diacrylates, (e) amides of α,β-olefinically unsaturated carboxylic acids containing 2 to 8 carbon atoms, (f) allyl alcohol, and (g) acrylic acids and acrylates having the formula

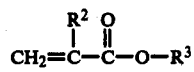

said $R^2$ being hydrogen or an alkyl radical containing 1 to 3 carbon atoms and said $R^3$ being hydrogen, an alkyl or hydroxy alkyl radical containing 1 to 18 carbon atoms, or an alkoxyalkyl, alkylthioalkyl or cyanoalkyl radical containing 2 to 12 carbon atoms.

4. A composition of claim 1 wherein said amine is used at a level of from about 0.5 to about 3 equivalents per one equivalent of said vinylidene-terminated polymer.

5. A cured composition of claim 1.

* * * * *